United States Patent [19]
Green

[11] Patent Number: 6,106,388
[45] Date of Patent: Aug. 22, 2000

[54] BELT GUIDE MEMBER

[75] Inventor: Gary L. Green, Lakeville, Minn.

[73] Assignee: Performax Products Corporation, Burnsville, Minn.

[21] Appl. No.: 09/094,215

[22] Filed: Jun. 9, 1998

[51] Int. Cl.⁷ .................................................. B24B 21/20
[52] U.S. Cl. .......................... 457/297; 451/299; 451/300; 451/65; 198/837; 198/840
[58] Field of Search .................................. 451/297, 303, 451/311, 299, 65, 57, 184, 355, 300, 336, 502; 198/840, 837

[56] References Cited

U.S. PATENT DOCUMENTS

| | | | |
|---|---|---|---|
| 2,303,976 | 12/1942 | Bawcutt et al. | 198/837 |
| 2,631,717 | 3/1953 | Cox | 198/837 |
| 3,266,197 | 8/1966 | Olton | 451/302 |
| 3,927,814 | 12/1975 | Holm | 198/840 |
| 4,917,232 | 4/1990 | Densmore | 198/830 |
| 4,972,670 | 11/1990 | Seki et al. | 451/57 |
| 5,181,347 | 1/1993 | Green | |

FOREIGN PATENT DOCUMENTS

| | | | |
|---|---|---|---|
| 2454682 | 11/1974 | Germany | 198/840 |
| 163215 | 9/1984 | Japan | 198/837 |

*Primary Examiner*—David A. Scherbel
*Assistant Examiner*—George Nguyen
*Attorney, Agent, or Firm*—Merchant & Gould P.C.

[57] ABSTRACT

A belt guide member for guiding an abrasive belt on a rotary drum sander. The belt guide member includes a slot for accommodating an edge of the abrasive belt. The belt guide member may have two slots, such that when one slot of the member has been used and is worn out, the other slot can be used by turning around the member. A ridge between the slots helps prevent the edge of the belt from folding over between the slots. The member may have a magnet at its bottom face for attaching to the sander and for facilitating removal and exchange of the member. The belt guide member may be manufactured from a ceramic material.

11 Claims, 3 Drawing Sheets

BELT GUIDE MEMBER

FIELD OF THE INVENTION

The present invention relates to sanders, and in particular to a belt guide member for an abrasive belt on a sander machine.

BACKGROUND OF THE INVENTION

Rotary drum sanders are typically used in wood-working projects, wherein the drum is rotatably mounted on a vertically-adjustable assembly, positioned over a horizontal bed. A workpiece is moved across the horizontal bed through the adjustable gap between the drum and the bed, so that the surface of the workpiece may be contacted by the drum as it passes through the gap. The gap is typically adjusted to be slightly narrower than the thickness of the workpiece, to permit the sanding material on the surface of the drum to abrade the workpiece.

The workpiece may be moved over the horizontal bed using an abrasive belt that travels over the bed. The outward-facing abrasive surface of the belt helps move the workpiece due to friction forces between the belt and the workpiece. The belt may for example be arranged as a loop around the horizontal bed, with rollers at the ends of the bed allowing the belt to rotate. Typically, one roller will be a driving roller, connected to a motor, and the other roller will be an idle roller.

During operation of the sander, the abrasive belt often has a tendency to skew relative to the rollers. As a result, the edges of the abrasive belt will come in contact with some non-moving part of the machine, resulting in the belt being destroyed, and/or damage to the machine. Adjustment of the abrasive belt to prevent skewing is commonly a time-consuming trial-and-error process.

SUMMARY OF THE INVENTION

The invention generally relates to belt guide members for sanding machines. A sander machine may include a pair of rollers and sanding platform positioned between the rollers. An abrasive belt is entrained about the rollers, wherein the belt extends over a top surface of the platform and under a bottom surface of the platform. A sanding mechanism is positioned above the platform for sanding an article conveyed by the abrasive belt. Flanges extend downward from the platform on opposite sides of the belt, and belt guide members are mounted on the flanges. The guide members define slots in which edges of the abrasive belt are received.

An embodiment of the belt guide member is formed from a ceramic material, and the belt guide member includes a magnet for securing it to the flanges.

These and various other advantages and features of novelty which characterize the invention are pointed out with particularity in the claims annexed hereto and forming a part hereof. However, for a better understanding of the invention, its advantages, and the object obtained by its use, reference should be made to the accompanying drawings and descriptive matter which form a further part hereof, and which is illustrated and described preferred embodiments of the invention.

BRIEF DESCRIPTION OF THE DRAWINGS

In the drawings, where corresponding reference numerals generally indicate corresponding parts throughout several views.

DETAILED DESCRIPTION OF THE DRAWINGS

Figure 1:
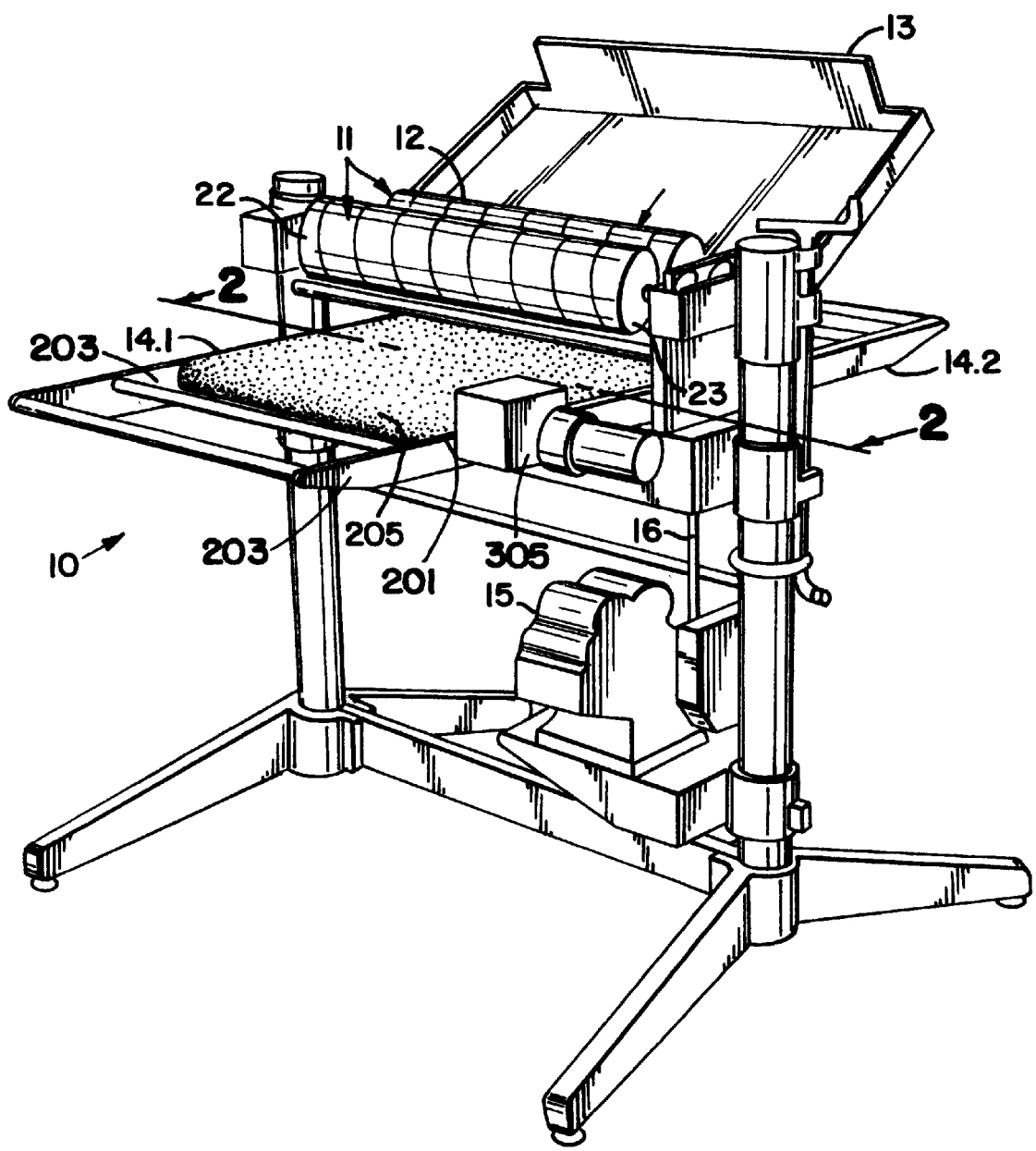
FIG. 1 is a perspective view of a drum sander.

As shown in FIG. 1, a dual rotary drum sander is indicated in general by the reference numeral 10. It includes a pair of primary and secondary rotatable sanding drums 11 upon which strips 12 of abrasive paper are wound in a helical or spiral manner. The rotary drum sander 10 further includes a safety cover 13 for the drums 11, an inlet feed table portion 14.1 on which a workpiece is fed for engagement with the drums 11, an outlet feed table portion 14.2 for receiving a sanded workpiece, and an electric motor unit 15 with a belt 16 for driving the drums 11. The inlet feed table portion 14.1 may, for example, include an abrasive belt 205 as indicated in FIG. 1. The abrasive belt helps move the workpiece through the sander. The rotary drum sander 10 is typically used for abrasive planing, surfacing boards, stock removal, glue removal, dimensioning boards, trueing warped boards, removing planar ripples, and finish sanding.

Abrasive belts generally comprise a backing and an abrasive material secured to the backing. The backing is typically made of a relatively non-resilient material such as paper, cloth or a film/paper laminate. Abrasive materials include, for example, ceramic or silicon carbide materials. The abrasive material is secured to the backing using techniques such as resin bonding, for example. Abrasive belts are typically used for abrading or sanding materials, exemplary materials being wood or metal. It is noted that the abrasive belt 205 is used to help move the workpiece, and is not primarily used for abrading or sanding the workpiece.

Figure 2:
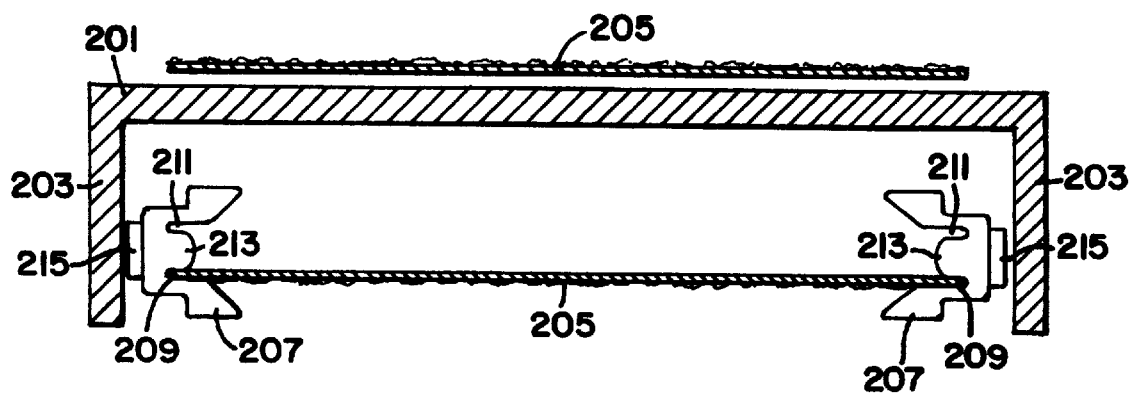
FIG. 2 is a diagrammatic partial cross-section taken along section line 2—2 of FIG. 1, showing belt guide members on flanges of a sanding platform, and an abrasive belt.

FIG. 2 is a diagrammatic partial cross-section schematically showing an embodiment of the invention. The view in FIG. 2 is taken along the line indicated 2—2 in FIG. 1. A sanding platform 201, formed by the top surface of the table portions 14.1 and 14.2, has flanges 203 extending downward. The flanges 203 are positioned on both sides of the abrasive belt 205, which forms a loop around the sanding platform 201. The sanding platform 201 is typically used to support the abrasive belt 205 from beneath when pieces of material are being sanded in the sander machine. A belt guide member 207 is mounted on each flange 203. The belt guide member 207 will be used to control the abrasive belt 205 and, for example, prevent it from sliding to either side of the sanding platform 201. The belt guide member 207 is manufactured from a material hard enough to resist the abrasion caused by the motion of the abrasive belt 205. For example, the belt guide member 207 may be formed from ceramic.

The edge of the abrasive belt 205 is positioned in a slot 209 of the belt guide member 207. The belt guide member 207 may be provided with a second slot 211. The second slot 211 may for example be used by turning the belt guide member 207 around when the slot 209 is worn out by the use of the machine. This reduces material costs and manufacturing costs, and it also extends the time during which the sanding machine can be used without replacing the belt guide member 207. A ridge 213 on the belt guide member 207 helps prevent the abrasive belt 205 from inadvertently being dislocated from slot 209. Similarly, the ridge 213 helps prevent the abrasive belt 205 from being inadvertently dislocated from slot 211, when that slot is being used.

The belt guiding member 207 is mounted to the flange 203 by an attachment member 215. The belt guide member 207 may be mounted on the flange 203 using a number of different well-known techniques. For example, attachment member 215 may be a magnet, fixed to the belt guide member 207, which magnetically attaches to the metal material of the flange 203.

Figure 3:
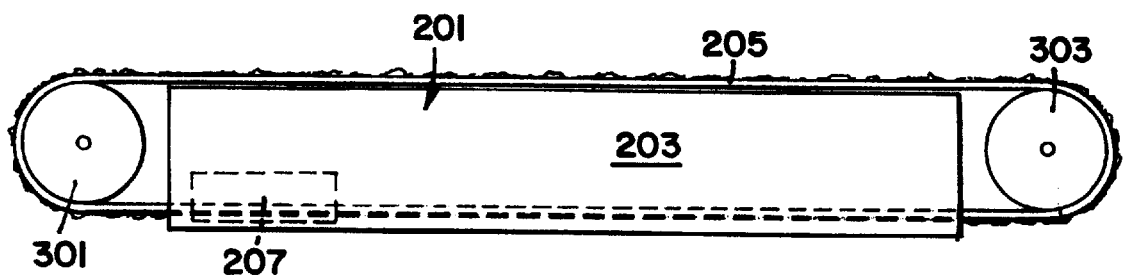
FIG. 3 is a diagrammatic side view of a sanding platform with a drive roller and an idle roller, and an abrasive belt.

FIG. 3 is a diagrammatic side view schematically showing an embodiment of the invention. The abrasive belt 205 is mounted on a drive roller 301 and an idle roller 303. The drive roller 301 is driven by a motor 305 (Shown in FIG. 1). The abrasive belt 205 forms a loop around the sanding platform 201. The belt guide member 207 is mounted on the inside of flange 203 which extends downward from the sanding platform 201. The belt guide member 207 and the part of the abrasive belt 205 which is located behind the flange 203 are shown in phantom. The belt guide member 207 is preferably positioned closer to the drive roller 301 than to the idle roller 303.

Figure 4:
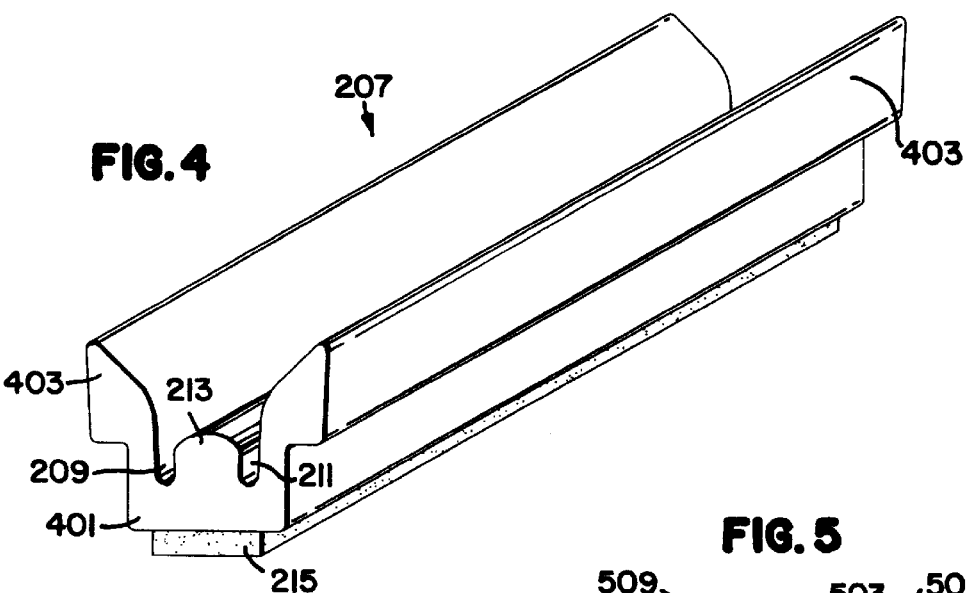
FIG. 4 is a perspective view of an embodiment of a belt guide member according to the invention.

FIG. 4 is a perspective view of an embodiment of the belt guide member 207. The belt guide member 207 includes a base portion 401 and shoulders 403 extending from the base portion 401 substantially along the length of the base portion 401. The ridge 213 of the guide member 207 is located centrally on the base portion 401 substantially over its entire length. The ridge 213 and the shoulders 403 form the slots 209 and 211 on each side of the ridge 213. The slots 209 and 211 have a configuration making them suitable for accommodating the edge of an abrasive belt which the belt guide member 207 is used to control. The attachment member 215 is located beneath the base portion 401 and is used for attaching the belt guide member 207 to a surface, for example on a sanding machine. The attachment member 215 may, for example, be a magnet mounted to the base portion 401.

Figure 5:
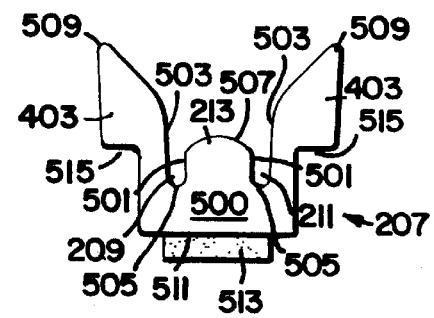
FIG. 5 is a front view of the embodiment in FIG. 4.

FIG. 5 is a front view of the embodiment of the belt guide member 207 showing its end surface 500. The ridge 213 is defined by side ridge surfaces 501 and a top ridge surface 507. The side ridge surfaces 501 are substantially perpendicular to a base surface 511 of the belt guide member 207. The top ridge surface 507 is a convex surface joining the side ridge surfaces 501. The shoulders 403 have shoulder surfaces 503 facing the slots 409. The shoulders 403 taper towards their upper end into shoulder edges 509. On the outside of the shoulders 403 there are recesses 515 adjacent the attachment member 215.

Figure 6:
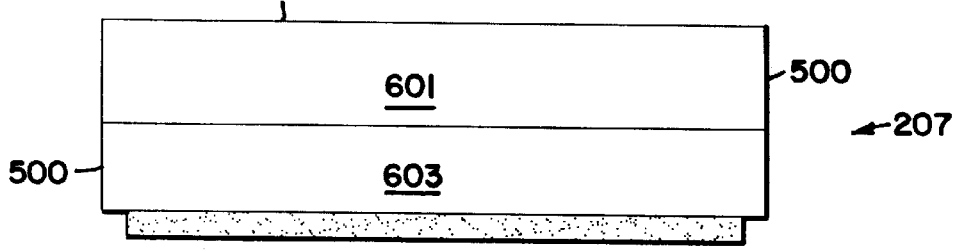
FIG. 6 is a side view of the embodiment in FIG. 4.

FIG. 6 is a side view of the embodiment of the belt guide member 207. An outer shoulder surface 601 is shown, and a recess surface 603 beneath it. End surfaces 500 and shoulder edge 509 are indicated in the drawing.

Figure 7:
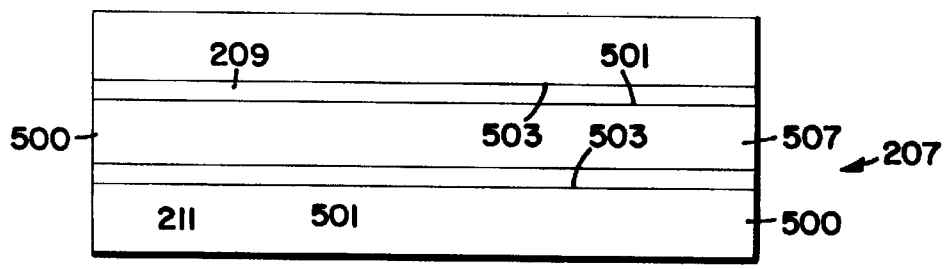
FIG. 7 is a top view of the embodiment in FIG. 4.

FIG. 7 is a top view of the embodiment of the belt guide member 207. Slots 209 and 211 are positioned between the end surfaces 500. The ridge surfaces 501 and shoulder surfaces 503 that define the slots 209 and 211 are indicated on the sides of the top ridge surface 507.

In using embodiments of the belt guide member 207, an abrasive belt, for example on a sanding machine, is conveniently and securely controlled and held in place. The belt guide member is preferably manufactured from a hard material with great resistance against the wear of the abrasive belt. If and when one of the slots of the belt guide member gets worn out from the abrasive belt, the belt guide member is easily turned over to facilitate use of the other slot for maintaining the abrasive belt in place. A magnet at the bottom of the belt guide member makes mounting and/or relocation of the belt guide member fast and straightforward.

It is to be understood, that even though numerous characteristics and advantages of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

I claim:

1. A sander comprising:

pair of rollers;

a sanding platform positioned between the rollers;

an abrasive belt entrained about the rollers, the belt extending over a top side of the platform and under a bottom side of the platform;

a sanding mechanism positioned above the platform for sanding an article conveyed by the abrasive belt;

flanges extending downward from the platform on opposite sides of the belt; and belt guide members mounted on the flanges, the guide members defining slots in which edges of the abrasive belt are received.

2. The sander of claim 1, wherein the belt guide members are ceramic.

3. The sander of claim 1, wherein guide members include magnets for securing guide members to the flanges.

4. The sander of claim 1, wherein the pair of rollers include a drive roller and an idle roller, and the guide members are mounted proximate the drive rollers.

5. The sander of claim 1, wherein the slots defined by the belt guide members are substantially straight and linear.

6. The sander of claim 1, wherein each belt guide member includes two substantially parallel slots separated by a ridge.

7. The sander of claim 1, wherein the belt guide members are non-rotatable.

8. The sander of claim 1, wherein the belt guide members are rigid.

9. The sander of claim 1, wherein the abrasive belt includes a relatively non-resilient backing, and an abrasive material secured to the backing.

10. The sander of claim 9, wherein the abrasive material comprises ceramic.

11. The sander of claim 9, wherein the abrasive material comprises silicon carbide.

* * * * *